United States Patent
Singvall et al.

(10) Patent No.: US 9,078,112 B2
(45) Date of Patent: Jul. 7, 2015

(54) CALLBACK FOR MULTI SUBSCRIPTION

(71) Applicant: Huawei Technologies Co., Ltd., Shenzhen (CN)

(72) Inventors: Jakob Singvall, Kista (SE); Philip Mansson, Furulund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/014,078

(22) Filed: Aug. 29, 2013

(65) Prior Publication Data

US 2014/0171038 A1 Jun. 19, 2014

Related U.S. Application Data

(63) Continuation of application No. PCT/EP2012/075628, filed on Dec. 14, 2012.

(51) Int. Cl.
*H04M 3/42* (2006.01)
*H04W 4/16* (2009.01)
*H04M 3/436* (2006.01)

(52) U.S. Cl.
CPC ............ *H04W 4/16* (2013.01); *H04M 3/42102* (2013.01); *H04M 3/42187* (2013.01);
(Continued)

(58) Field of Classification Search
CPC ....... H04W 4/16; H04W 36/14; H04W 88/06; H04W 8/18; H04L 12/1827; H04M 1/72522
USPC .............. 455/416, 406, 417, 344, 414.1, 405, 455/422, 435, 424, 558, 435.2, 445
See application file for complete search history.

(56) References Cited

U.S. PATENT DOCUMENTS 6,445,921 B1 9/2002 Bell
2003/0211840 A1* 11/2003 Castrogiovanni et al. .... 455/405
(Continued)

FOREIGN PATENT DOCUMENTS

EP 2268090 A2 12/2010
WO 2012146072 A1 1/2012
(Continued)

OTHER PUBLICATIONS

Foreign Communication From A Counterpart Application, PCT Application No. PCT/EP2012/075628, International Search Report dated Mar. 15, 2013, 6 pages.
(Continued)

*Primary Examiner* — Joseph Arevalo
(74) *Attorney, Agent, or Firm* — Conley Rose, P.C.; Grant Rodolph; Nicholas K. Beaulieu

(57) ABSTRACT

A communication device and method for facilitating call back from a communication device with multiple subscriber identities comprising at least a first subscriber identity and a second subscriber identity. The method comprises receiving a telephone call on a first subscription associated with the first subscriber identity from another communication device. The method also comprises determining an order of prioritization among the subscriber identities according to at least one parameter for establishing the telephone call with the other communication device on the subscription associated with the respective subscriber identities. In further addition, the method comprises facilitating call back to the other communication device using the second subscriber identity when it is determined that the second subscriber identity is more prioritized than the first subscriber identity.

17 Claims, 5 Drawing Sheets

(52) U.S. Cl.
CPC ...... *H04M3/42195* (2013.01); *H04M 3/42238* (2013.01); *H04M 3/42289* (2013.01); *H04M 3/436* (2013.01); *H04M 2201/18* (2013.01); *H04M 2203/2011* (2013.01); *H04M 2203/551* (2013.01); *H04M 2215/7464* (2013.01); *H04M 2250/66* (2013.01)

(56) References Cited

U.S. PATENT DOCUMENTS

| | | |
|---|---|---|
| 2009/0186651 A1 | 7/2009 | You |
| 2010/0029273 A1* | 2/2010 | Bennett ................. 455/435.2 |
| 2011/0026468 A1* | 2/2011 | Conrad et al. ............. 370/329 |
| 2013/0281054 A1* | 10/2013 | Ye et al. ................. 455/410 |
| 2013/0303139 A1* | 11/2013 | Helfre et al. ............. 455/417 |

FOREIGN PATENT DOCUMENTS

| | | | |
|---|---|---|---|
| WO | WO 2012/041663 A1 * | 4/2012 | ........... H04W 4/16 |
| WO | WO 2012159458 A1 * | 11/2012 | ........... H04W 4/16 |

OTHER PUBLICATIONS

Foreign Communication From A Counterpart Application, PCT Application No. PCT/EP2012/075628, Written Opinion dated Mar. 15, 2013, 6 pages.

* cited by examiner

CALLBACK FOR MULTI SUBSCRIPTION

CROSS-REFERENCE TO RELATED APPLICATION

This application is a continuation of International Application No. PCT/EP2012/075628, filed on Dec. 14, 2012, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Implementations described herein relate generally to a communication device and a method in a communication device. In particular, described herein is a mechanism for callback on a communication device comprising more than one subscription identity.

BACKGROUND

A communication device, also known as User Equipment (UE), mobile station, wireless terminal, receiver and/or mobile terminal is enabled to communicate wirelessly in a wireless communication system, sometimes also referred to as a cellular radio system. The communication may be made e.g. between two communication devices, between a communication device and a wire connected telephone and/or between a communication device and a server via a Radio Access Network (RAN) and possibly one or more core networks.

The communication device may further be referred to as mobile telephone, cellular telephone, computer tablet or laptop with wireless capability. The communication devices in the present context may be, for example, portable, pocket-storable, hand-held, computer-comprised, or vehicle-mounted mobile devices, enabled to communicate voice and/or data, via the radio access network, with another entity, such as another communication device or a server.

The wireless communication system covers a geographical area which is divided into cell areas, with each cell area being served by a radio network node, or base station e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. A cell is the geographical area where radio coverage is provided by the radio network node/base station at a base station site. One radio network node, situated on the base station site, may serve one or several cells. The radio network nodes communicate over the air interface operating on radio frequencies with the communication devices within range of the respective radio network node.

In some radio access networks, several radio network nodes may be connected, e.g. by landlines or microwave, to a Radio Network Controller (RNC) e.g. in Universal Mobile Telecommunications System (UMTS). The RNC, also sometimes termed Base Station Controller (BSC) e.g. in Global System for Mobile Communications (GSM), may supervise and coordinate various activities of the plural radio network nodes connected thereto.

In 3rd Generation Partnership Project (3GPP) Long Term Evolution (LTE) radio network nodes, which may be referred to as eNodeBs or eNBs, may be connected to a gateway e.g. a radio access gateway, to one or more core networks.

In the present context, the expressions downlink, downstream link or forward link may be used for the transmission path from the radio network node to the communication device. The expression uplink, upstream link or reverse link may be used for the transmission path in the opposite direction i.e. from the communication device to the radio network node.

Wireless Fidelity (Wi-Fi), which also may be spelled Wifi, WiFi or WIFI, is a popular technology that allows the communication device to exchange data wirelessly over a computer network, including high-speed Internet connections. The Wi-Fi Alliance defines Wi-Fi as any Wireless Local Area Network (WLAN) products that are based on the Institute of Electrical and Electronics Engineers' (IEEE) 802.11 standards.

A communication device that is configured to use Wi-Fi such as e.g. a personal computer, video game console, smartphone, tablet, or digital audio player. The communication device in the present context may be, for example, portable, pocket-storable, hand-held, computer-comprised, or vehicle-mounted mobile devices, enabled to communicate voice and/or data, via the radio access network, with another entity, such as another device, a radio network node or a server. The communication device may connect to a network resource such as the Internet via a wireless network access point. Such an access point, or hotspot as it also may be referred to, may have a range of about 20 meters (65 feet) indoors and a greater range outdoors. Hotspot coverage may comprise an area as small as a single room with walls that block radio waves or as large as many square miles, which may be achieved by using multiple overlapping access points.

In a Wi-Fi enabled device, the communication device needs to search for networks to be able to connect, in order to perform e.g. a Voice over the Internet Protocol (VoIP) call.

A communication device may sometimes comprise two or more subscriber identities, such as Subscriber Identity Modules (SIMs). Such a communication device may occasionally be referred to as a Dual SIM phone, or Multiple SIM phone. Each subscriber identity of such communication device may be associated with a modem that is configured for communication over a certain access technology, such as GSM, UMTS, LTE, etc., and/or a VoIP, such as Skype or Google voice.

However, one or more of the subscriber identities may be considered primary subscriber identity and the rest of the subscriber identities are considered secondary subscriber identities. On such a communication device, a mobile originated (outgoing) call is/may be done according to users preferences, e.g. on the subscription with lowest rate or best voice quality.

Generally the user may select which subscriber identity is primary depending on a cost plan.

However, for a mobile terminated, i.e. incoming call, no such choice is possible besides manual call back involving several steps, such as copying the telephone number of the initiator of the incoming call, refusing the incoming call, determining and selecting the best/preferred subscription for call back, entering the noted telephone number of the initiator of the call, call back and wait until the initiating caller response. These manual steps consume time and result in non acceptable delays from a user point of view, especially for the other party, i.e. the initiator of the mobile terminated call.

SUMMARY

It is therefore an object to obviate at least some of the above mentioned disadvantages and to improve the performance in a communication infrastructure.

According to a first aspect, the object is achieved by a method in a communication device. The communication device is configured for multiple subscriber identities, comprising at least a first subscriber identity and a second subscriber identity, for facilitating call back. The method comprises receiving a telephone call on a first subscription, associated with the first subscriber identity, from another communication device. Further, the method comprises determining an order of prioritization among the subscriber identities, according to at least one parameter, for establishing the telephone call with the other communication device on the subscription associated with the respective subscriber identities. Also, the method comprises facilitating call back to the other communication device using the second subscriber identity, when it is determined that the second subscriber identity is more prioritized than the first subscriber identity.

According to a second aspect, the object is achieved by a communication device. The communication device is configured for multiple subscriber identities comprising at least a first subscriber identity and a second subscriber identity. The communication device is configured for facilitating call back. The communication device comprises a receiver configured for receiving a telephone call on a first subscription, associated with the first subscriber identity, from another communication device. Also, the method comprises a processing circuit configured for determining an order of prioritization among the subscriber identities, according to at least one parameter, for establishing the telephone call with the other communication device. In addition, the communication device is also configured for facilitating call back to the other communication device using the second subscriber identity, when it is determined that the second subscriber identity is more prioritized than the first subscriber identity.

Some advantages according to embodiments herein comprise that, when a telephone call is received from another communication device on an unfavourable subscription, such as e.g. a subscription requiring roaming over a visited network, a user friendly method of making a call back to the originator of the telephone call on a favourable subscription, is provided. In some embodiments, the user is enabled to make the call back by pressing a soft key when accepting the call, thereby selecting the subscription from which the call back is to be made. In some embodiments, the call back is automatically made when the user accepts the call. Thereby, telephone conversation over an unfavourable subscription could be avoided, without unnecessary extra labour for the user and without any substantial delay for the original caller. Thereby, money may be saved for the user, when the unfavourable subscription is made over a roaming connection. However, in other embodiments, the unfavourable subscription may suffer from bad signaling conditions, offering only a deteriorated communication. In such case, call back may be made over a subscription supporting a radio access technology having a momentarily better link quality. Thereby, the user as well as the original caller may enjoy an enhanced communication experience. Further, dropped calls may be avoided.

Thus an improved performance within a wireless communication infrastructure is provided.

Other objects, advantages and novel features of the described embodiments of the invention will become apparent from the following detailed description.

BRIEF DESCRIPTION OF THE DRAWINGS

Embodiments of the invention are described in more detail with reference to attached drawings illustrating examples of embodiments in which.

DETAILED DESCRIPTION

Embodiments of the invention described herein are defined as a communication device and a method in a communication device, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
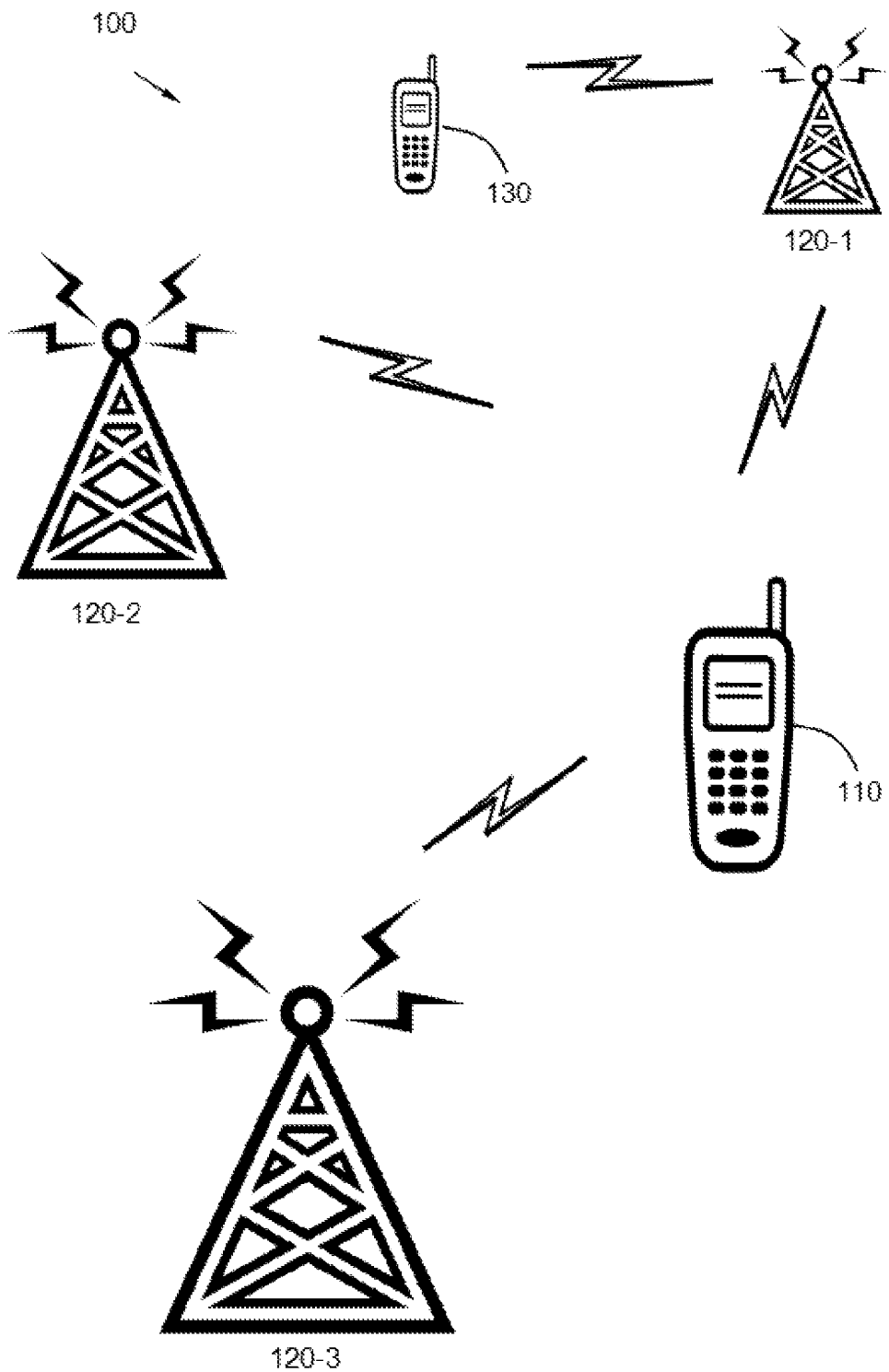
FIG. 1 is a block diagram illustrating an infrastructure overview, wherein the invention is implemented.

FIG. 1 is a schematic illustration over a wireless communication infrastructure 100.

The illustration in FIG. 1 comprises a communication device 110 and network nodes 120-1, 120-2, 120-3. The network node 120-1, 120-2, 120-3 may comprise a cellular radio network node or an access point of a wireless local area network. Further, a second communication device 130 is illustrated.

The wireless communication infrastructure 100 may at least partly comprise a cellular radio network, which in turn may be based on radio access technologies such as e.g. 3GPP LTE, LTE-Advanced, Evolved Universal Terrestrial Radio Access Network (E-UTRAN), UMTS, GSM, Enhanced Data rate for GSM Evolution (GSM/EDGE), Wideband Code Division Multiple Access (WCDMA), Worldwide Interoperability for Microwave Access (WiMax), Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some options.

The cellular radio network may be configured to operate according to the Frequency Division Duplexing (FDD) and/or Time-Division Duplexing (TDD) principle, according to different embodiments.

TDD is an application of time-division multiplexing to separate uplink and downlink signals in time, possibly with a Guard Period situated in the time domain between the uplink and downlink signaling. FDD means that the transmitter and receiver operate at different carrier frequencies, as has previously been discussed.

The purpose of the illustration in FIG. 1 is to provide a simplified, general overview of the methods and nodes, and the functionalities involved. The method and communication device 110 will subsequently, as a non-limiting example, be described in a 3GPP/LTE environment, but the embodiments of the disclosed methods, radio network node and communication device 110 may operate in a wireless communication system based on another access technology such as e.g. any of the above enumerated. Thus, although the embodiments of the invention are described based on, and using the terminology of, 3GPP LTE systems, it is by no means limited to 3GPP LTE.

The wireless local area network, or WLAN, may be a Wi-Fi as defined by any of IEEE standards 802.11a, b, g and/or n. The Wi-Fi network is configured to exchange data wirelessly, using radio waves over a computer network, including high-speed Internet connections. It is to be noted that the expressions wireless local area network and/or Wi-Fi may be used somewhat interchangeably with each other within the current context.

The communication device 110 is configured for communication both over the cellular radio communication network via the network node 120-1, 120-2, 120-3 comprising a cellular radio network node, and over the wireless local area network via the network node 120-1, 120-2, 120-3 comprising an access point. Further, the communication device 110 may comprise, or be represented by, a UE, a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) node, a personal computer, a video game console, a smartphone, a tablet, a digital audio player or any other kind of device configured to communicate wirelessly with the network node 120-1, 120-2, 120-3 comprising the cellular radio network node or the access point, according to different embodiments and different vocabulary.

The remote communication device 130 is configured to establish a telephone call, to be received by the communication device 110 via the any of the network nodes 120-1, 120-2, 120-3, which may comprise cellular radio network nodes and/or Wi-Fi access points. The remote communication device 130 may be similar to the above described communication device 110, but it may also comprise a stationary telephone and/or stationary computer connected to the wireless communication infrastructure 100 by a wired connection, in some embodiments.

Even though the expression telephone call is utilised herein, the invention is not confined to either telephones or to voice calls. The invention may be exercised by any communication device 110 configured for receiving any communication connection from the remote communication device 130. For example, according to some embodiments the invention may be exercised by a communication device 110 comprising a computer tablet, or other similar device receiving a Short Message Service (SMS) message, a Multimedia Messaging Service (MMS), a Video Message Service (VMS), an Enhanced Messaging Service (EMS), an e-mail, a video telephony call or similar means of communication from the remote communication device 130.

It is to be noted that the illustrated network setting of two communication devices 110, 130 and three network nodes 120-1, 120-2, 120-3 in FIG. 1 is to be regarded as a non-limiting example of an embodiment only. The wireless communication system may comprise any other number and/or combination of network nodes 120-1, 120-2, 120-3 and/or communication devices 110, 130, although only two instances of communication devices 110, 130 and three network nodes 120-1, 120-2, 120-3, respectively, are illustrated in FIG. 1, for clarity reasons. A plurality of communication devices 110, 130 and/or network nodes 120-1, 120-2, 120-3 may further be involved in some embodiments of the disclosed invention.

Thus whenever "one" or "a/an" communication device 110, 130 and/or network node 120-1, 120-2, 120-3 is referred to in the present context, a plurality of communication devices 110, 130 and/or network nodes 120-1, 120-2, 120-3 may be involved, according to some embodiments.

The network node 120-1, 120-2, 120-3, when comprising a cellular radio network node, may according to some embodiments be referred to as e.g. base stations, NodeBs, evolved Node Bs (eNBs, or eNode Bs), base transceiver stations, Access Point Base Stations, base station routers, RBSs, macro base stations, micro base stations, pico base stations, femto base stations, Home eNodeBs, sensors, beacon devices, relay nodes repeaters or any other network nodes configured for communication with communication devices 110, 130 over a wireless interface, depending e.g. on the radio access technology and terminology used. The cellular radio network node controls the radio resource management within a cell, such as e.g. allocating radio resources to the communication devices 110, 130 within the cell and ensuring reliable wireless communication between the cellular radio network node and the communication device 110, 130. The cellular radio network node may typically comprise an eNodeB, e.g. in an LTE-related wireless communication system.

The network node 120-1, 120-2, 120-3, when comprising an access point of the wireless local area network, which further may be referred to as a hotspot, may have a range of about 20 meters (65 feet) indoors and a somewhat greater range outdoors according to some embodiments. However, the access point may be based on IEEE standard 802.11b or 802.11g with a stock antenna and may have a range of 32 m (120 ft) indoors and 95 m (300 ft) outdoors. According to some further embodiments the access point may be based on IEEE standard IEEE 802.11n, however, and may more than double the enumerated ranges.

Further, the communication device 110 comprises at least two subscriber identities, such as two SIMs or a multitude of an arbitrary number of SIMs. The respective subscriber identities may be configured for a particular radio access technology such as GSM, UMTS and/or LTE, according to some embodiments. In some embodiments, the communication device 110 may comprise a plurality of SIMs, associated with the same, or different radio access technologies.

However, the respective subscriber identities may be configured for a VoIP subscription in some embodiments. Thus the communication device 110 with multiple subscriptions in different embodiments may comprise a dual SIM, a triple SIM, a quad SIM, a penta SIM, a hexa SIM, a hepta SIM, an octa SIM, a nona SIM, a deca SIM, or just be referred to as a multi SIM comprising n subscription identities, where n is an arbitrary positive integer exceeding one. In some embodiments, the communication device 110 with multiple subscriptions may comprise a single SIM and a VoIP subscription, a dual SIM and a VoIP subscription, a triple SIM and a VoIP subscription, etc. Furthermore, in some alternative embodiments, the communication device 110 with multiple subscriptions may comprise two VoIP subscriptions, three VoIP subscriptions, . . . , n VoIP subscriptions, where n is an arbitrary integer.

The VoIP subscription(s) may comprise e.g. Skype, Google Voice/Google Talk, Gizmo5, Federated VoIP, AOL Instant Messenger, Blink, Bria, Cisco IP Communicator, Ekiga, Empathy, Eyeball Chat, eyeBeam, IBM Sametime, iCall, Jitsi, KPhone, Linphone, MicroSIP, Mirial Softphone, Mumble, Nymgo, oovoo, Phoner, PhonerLite, QuteCom, Revation Communicator, CommunicatorLive, SFLphone, SightSpeed, Spikko, TeamViewer, TeamSpeak, Tokbox, Toktumi Unlimited/Line2 Pro, Tru App, Twinkle, Vbuzzer, Ventrilo, Voice Operator Panel, X-Lite, Yahoo! Messenger, Yate, Zfone, Acrobits Groundwire, Acrobits Softphone, CSipSimple, Jajah Mobile Web, Line2, Sipdroid, Truphone, Vopium, Windows Mobile 6, X-PRO for Pocket PC, or any similar product implementation with similar functionality.

According to some embodiments of the invention, the communication device 110 is configured for receiving a telephone call from another communication device 130.

If a mobile terminated call is initiated on an unfavourable subscription, the invention automatically, or with minimum user interaction according to different embodiments, may make a call back using the optimal subscription with respect to (from user point of view) cost and/or speech/link quality and/or any other criteria. The criteria may depend on time, location, environment, etc., in different embodiments.

The core of the inventive idea described herein comprises to facilitate call back to the other communication device 130, who has initiated the mobile terminated telephone call. Thus, some embodiments may comprise automate rejection of mobile terminated call on a non-optimal subscription and initiation of a call back using the at this time optimal subscription in terms of e.g. costs. The criteria may also, and/or alternatively comprise speech/link quality, or any other criteria.

The call back may be done automatically when the user accepts the call, according to some embodiments. However, in some embodiments, the user may get the options to manually choose between "Accept", "Reject", and "Call back on subscription x". The call back option may only be present when it is possible to do a call back according to some embodiments, i.e. subscription x may be active (within coverage, etc.) and the calling communication device's ID/number is known.

The selection of optimal, or at least preferred subscription may according to some alternative embodiments comprise:

1. Fully manual, i.e. all active subscriptions may be listed (potentially with additional information in order ease selection), enabling the user to select the optimal subscription, or 2. Fully automatic selection algorithm. The optimal subscription may be presented to the user, or 3. Semi automatic, where a selection algorithm produces a list of potential call back subscriptions in a specific order of preferences (e.g. cost, price or weighted cost and price) defined by user preferences.

Furthermore, the criteria for selecting the optimal subscription may comprise, in some different non-limiting examples: time; many subscriptions have time as a function in pricing. Roaming; the user may have one subscription for usage at home and another for use in other legislations/abroad. The non-roaming subscription may usually be selected, in some embodiments. Link quality; if currently in a non-acceptable link quality, e.g. the probability for dropped call is high, the subscription may not be selected in some embodiments. Also, according to certain embodiments, the properties of the other communication device 130 may have an impact.

Embodiments of the method and communication device 110 may handle all, any or some of the steps from rejecting the mobile terminated call to initiation of the call back, i.e. to check availability of alternative subscriptions to be used for call back comprising check of caller's identity/number. Further, the method and communication device 110 may comprise prioritisation of available alternative subscriptions according to user preferences, e.g. cost (might be a function of roaming, time, etc.) and/or quality (measured link quality, location, etc.). In addition, the method and communication device 110 may comprise user interaction by selecting action for incoming call: accept, reject, or call back. Furthermore, alternatively, the call back may be default when the user accepts the incoming call, according to some embodiments. The method and communication device 110 may further comprise rejecting of any incoming call on an unfavourable subscription, and initiation of call back on a selected alternative subscription, according to some embodiments.

Embodiments described herein may be used in order to optimise, or at least improve costs from a user perspective when more than one subscription is present in the communication device 110. Further, embodiments herein may be used to improve user experience by selecting the subscription with best quality and avoid dropped calls, according to some embodiments.

Figure 2A:
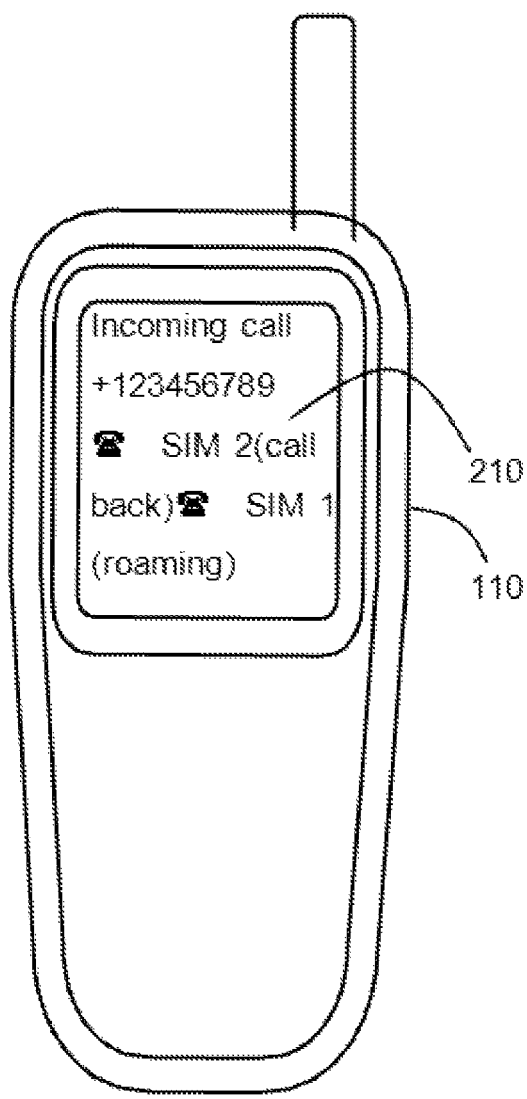
FIG. 2A is a block diagram illustrating a communication device according to an embodiment of the invention.

FIG. 2A is a block diagram illustrating a communication device 110 configured for multiple subscription identities, according to an embodiment of the invention.

FIG. 2A illustrates an example of the user interface 210 for a mobile terminated call/incoming call to a first subscription identity/SIM1, which in this non-limiting example is roaming, i.e. costly to answer. A number of alternative selections may be presented for the user on the user interface 210, e.g. comprising a list of subscription identities, for making a call back to the calling communication device 130, which the user may select for effectuating the call back, according to some embodiments. The list of subscription identities may comprise subscription identities that are available for the communication device 110 for making the call back. Further, the list of subscription identities may be presented in a decreasing order of preference, according to configurable or predetermined criteria.

Figure 2B:
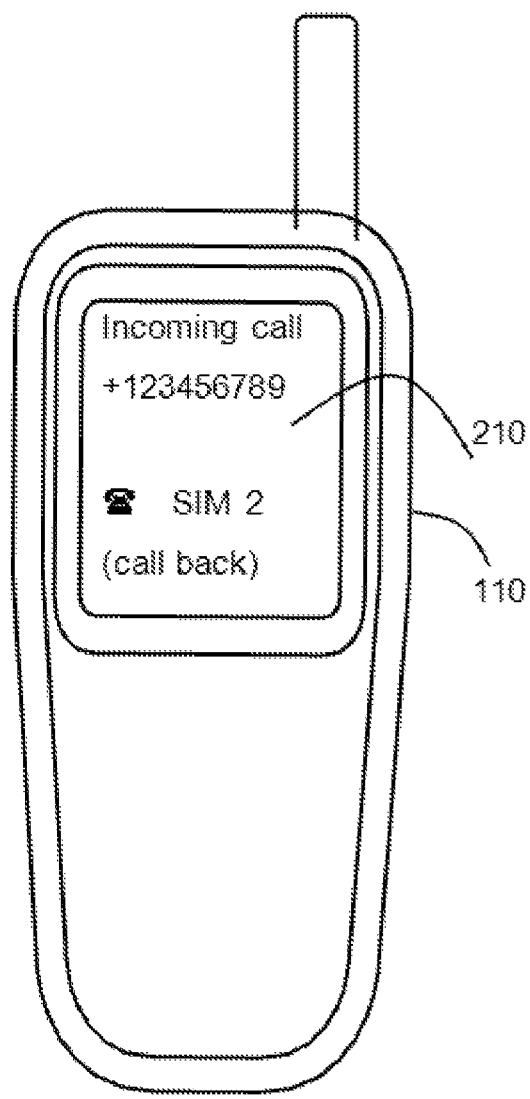
FIG. 2B is a block diagram illustrating a communication device according to an embodiment of the invention.

FIG. 2B is a block diagram illustrating a communication device 110 configured for multiple subscription identities, according to another embodiment of the invention.

FIG. 2B illustrates an example of the user interface 210 for a mobile terminated call/incoming call to a first subscription identity/SIM1, which in this non-limiting example is roaming, i.e. costly to answer. The call back is automatically initiated on the second subscription identity/SIM2, without requiring any further input from the user, according to some embodiments.

Figure 3:
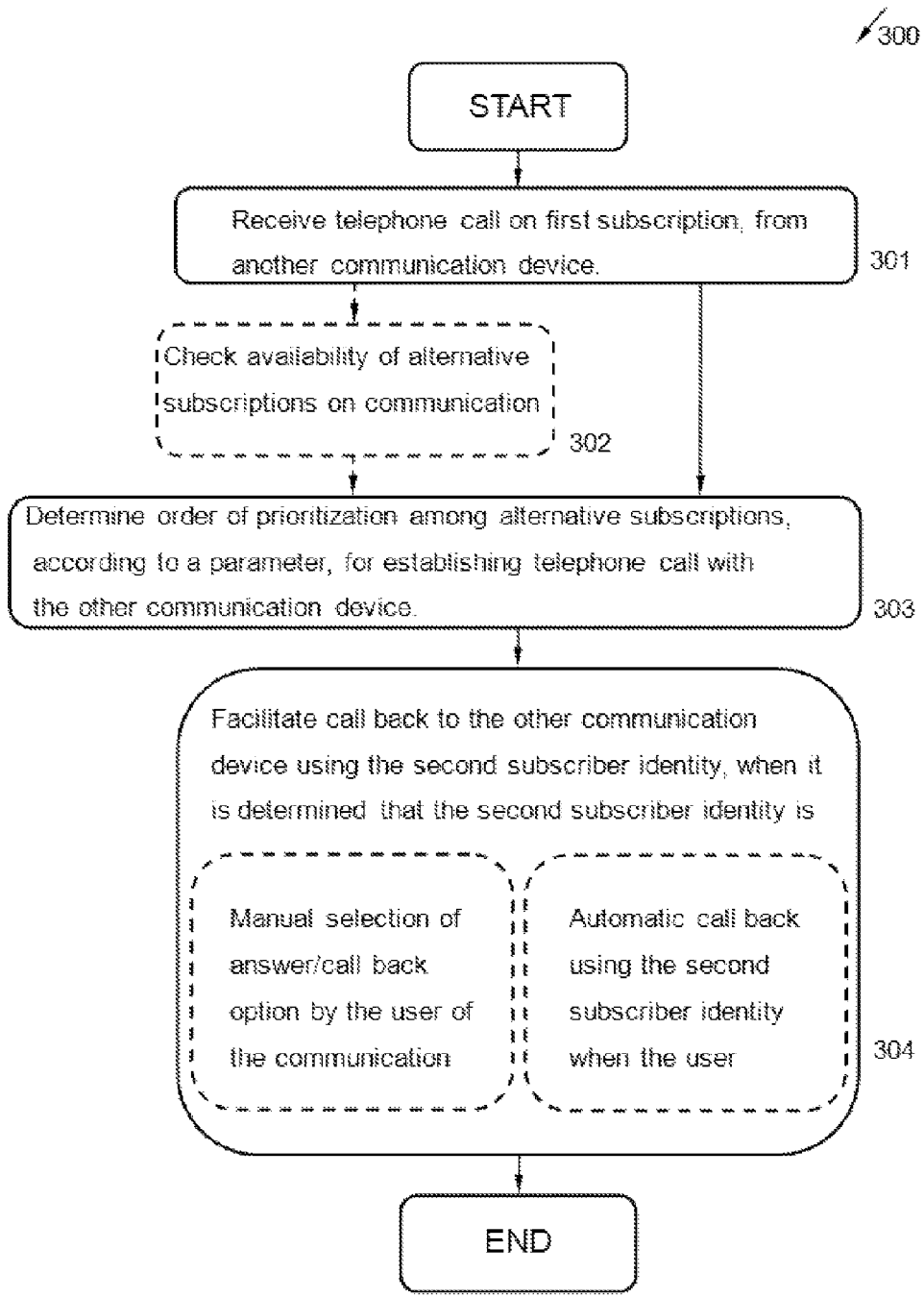
FIG. 3 is a flow chart illustrating a method according to some embodiments, for facilitating call back.

FIG. 3 is a flow chart illustrating embodiments of a method 300 for use in a communication device 110. The communication device 110 is configured for multiple subscriber identities, comprising at least a first subscriber identity and a second subscriber identity.

The first subscriber identity and/or the second subscriber identity may comprise any of a SIM card, a Universal Integrated Circuit Card (UICC), a Universal Subscriber Identity Module (USIM), an Internet protocol multimedia Services Identity Module (ISIM), a Removable User Identity Module (R-UIM), a CDMA Subscriber Identity Module (CSIM), a Willcom-SIM (W-SIM), and/or a VoIP subscription, according to different embodiments.

The method 300 aims at facilitating call back over a wireless communication system 100, from the communication device 110 to the other communication device 130. The wireless communication system 100 may comprise a cellular network based on any radio access technology of: GSM, Enhanced Data Rates for GSM Evolution (EDGE), Universal Mobile Telecommunications System (UMTS), Code Division Multiple Access (CDMA), CDMA 2000, Time Division Synchronous CDMA (TD-SCDMA), LTE within the 3GPP, or possibly a similar radio access technology, in different embodiments. Further, the wireless communication system 100 may comprise a Wi-Fi network, as defined by any of IEEE standards 802.11a, b, g and/or n.

The communication device 110 may be configured for radio communication with the cellular network, and/or for accessing the wireless local area network according to different embodiments.

The method 300 may only be performed when the telephone number of the other communication device 130 is available, according to some embodiments.

To appropriately make the emergency call over the wireless communication system 100, the method 300 may comprise a number of actions 301-304.

It is however to be noted that any, some or all of the described actions 301-304, may be performed in a somewhat different chronological order than the enumeration indicates, or even be performed simultaneously. Further, some of the actions may be optional, and only performed in some alternative embodiments, such as e.g. action 302. The method 300 may comprise the following actions:

Action 301

A telephone call is received on a first subscription, associated with the first subscriber identity, from another communication device 130.

It may further be determined whether the telephone call is received on a subscriber identity which is not optimal for telephone connection with the other communication device 130. Thus, when the telephone call is received on a subscriber identity which is optimal, the subsequent actions 302-304 comprised in the method 300 may be omitted, according to some embodiments.

Action 302

This action may be performed in some alternative embodiments, but not in all embodiments.

The availability of alternative subscriptions, associated with subscriber identities on the communication device 110 may be checked.

Thereby, it may be avoided that any call back attempts are made on any alternative subscriptions, for which there at the moment is no signal reception at all.

Action 303

An order of prioritization among the subscriber identities is determined, according to at least one parameter, for establishing the telephone call with the other communication device 130 on the subscription associated with the respective subscriber identities.

The at least one parameter used for determining the order of prioritization among the subscriber identities, may comprise: price, link quality, time of the day, roaming, location of the communication device 110 and/or properties of the other communication device 130, according to some embodiments.

Thereby, by making such prioritization, it may be avoided to make a call back over a roaming subscription.

Action 304

Call back to the other communication device 130, using the second subscriber identity is facilitated, when it is determined 303 that the second subscriber identity is more prioritized than the first subscriber identity.

According to some embodiments, the action of facilitating call back to the other communication device 130 may comprise presenting a list of alternatives to the user of the communication device 110. These alternatives may comprise at least one of: accepting the call, rejecting the call, call back using the second subscriber identity, and call back using the subscriber identity which is most prioritized. Further, the action of facilitating call back to the other communication device 130 may comprise acquiring a user selection of one of the presented alternatives on the list, from the user of the communication device 110. In further addition, the action of facilitating call back to the other communication device 130 may comprise rejecting the incoming call, and also initiating call back using the second subscriber identity, when the user of the communication device 110 selects to call back using the second subscriber identity.

However, according to some embodiments, the action of facilitating call back to the other communication device 130 may comprise rejecting the incoming call; and initiating call back using the second subscriber identity, when it is determined 303 that the second subscriber identity is more prioritized than the first subscriber identity.

Figure 4:
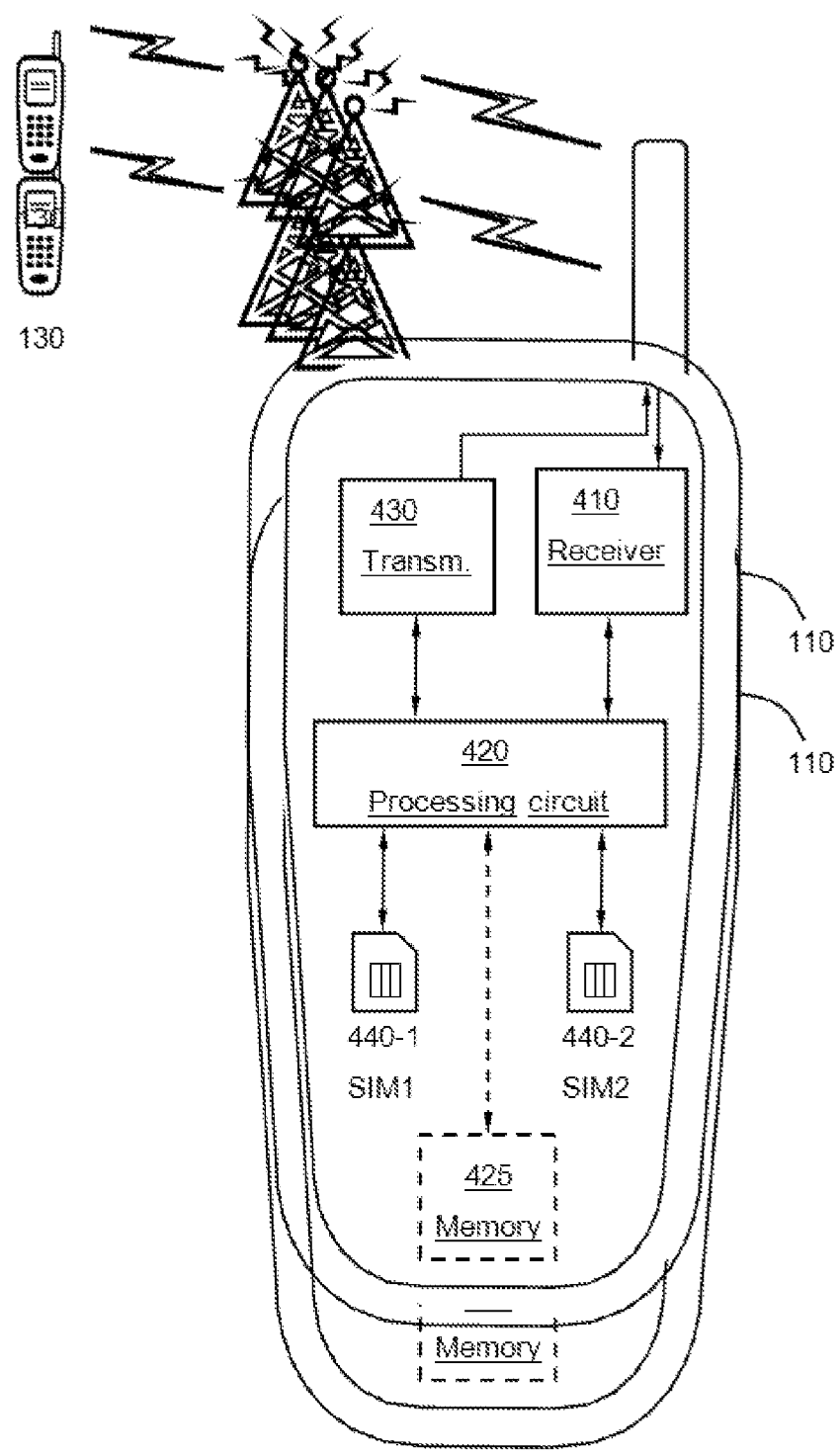
FIG. 4 is a block diagram illustrating a communication device according to an embodiment of the invention.

FIG. 4 is a block diagram illustrating a communication device 110 configured both for radio communication with a cellular radio network and/or with a wireless local area network. The communication device 110 is configured to perform the different embodiments of the above described method 300 according to any, some or all of the actions 301-304 for facilitating call back.

The communication device 110 is configured for multiple subscriber identities 440-1, 440-2, comprising at least a first subscriber identity 440-1 and a second subscriber identity 440-2.

The first subscriber identity 440-1 and/or the second subscriber identity 440-2 may comprise any of a SIM card, a UICC, a USIM, an ISIM, a R-UIM, a CSIM, a W-SIM and/or a VoIP subscription, according to different embodiments.

The communication device 110 aims at facilitating call back over a wireless communication system 100, from the communication device 110 to the other communication device 130. The wireless communication system 100 may comprise a cellular network based on any radio access technology of: GSM, EDGE, UMTS, CDMA, CDMA 2000, TD-SCDMA, LTE within the 3GPP, or possibly a similar radio access technology, in different embodiments. Further, the wireless communication system 100 may comprise a Wi-Fi network, as defined by any of IEEE standards 802.11a, b, g and/or n.

For enhanced clarity, any internal electronics or other components of the communication device 110, not completely indispensable for understanding the herein described embodiments have been omitted from FIG. 4.

The communication device 110 is configured to perform the different embodiments of the above described method 300 according to any, some or all of the actions 301-304 for accessing the access point 140 of the wireless local area network for facilitating call back.

The communication device 110 comprises a receiver 410 configured for receiving a telephone call on a first subscription, associated with the first subscriber identity 440-1, from another communication device 130.

Further, the communication device 110 comprises a processing circuit 420 configured for determining an order of prioritization among the subscriber identities 440-1, 440-2, according to at least one parameter. Further, the processing circuit 420 is also configured for establishing the telephone call with the other communication device 130. In addition, the processing circuit 420 is furthermore configured for facilitating call back to the other communication device 130 using the second subscriber identity 440-2, when it is determined that the second subscriber identity 440-2 is more prioritized than the first subscriber identity 440-1.

The prioritization may be made according to the at least one parameter used for determining the order of prioritization among the alternative subscriptions may comprise any, some or all of: price, link quality, time of the day, roaming, location of the communication device 110 and/or properties of the other communication device 130.

The processing circuit 420 may further be alternatively configured for acquiring a selection of one of the presented alternatives on the list, from the user of the communication device 110 and also configured for rejecting the incoming call.

The processing circuit 420 may further be configured for rejecting the incoming call, according to some embodiments.

The communication device 110 may according to some alternative embodiments comprise a display 210 for presenting a list of alternatives to the user of the communication device 110. The optional list may comprise at least one of: accepting the call, rejecting the call, call back using the second subscriber identity 440-2, and call back using the subscriber identity 440-1, 440-2 which is most prioritized.

The processing circuit 420 may further in addition be configured for checking availability of alternative subscriptions associated with subscriber identities 440-1, 440-2 on the communication device 110, according to some embodiments.

Furthermore, the processing circuit 420 may furthermore be configured for only performing the method 300 when the telephone number of the other communication device 130 is available. It is thereby avoided to start performing actions of the method 300 in vain, when there is no possibility to call back in case e.g. the calling communication device 130 has a non-registered telephone number, or a secret telephone subscription. In such case, the user may be given the alternative to response to the call (on the non-optimal subscription), or reject the call, in some embodiments.

The processing circuit 420 may comprise e.g. one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as e.g. any, some or all of the ones enumerated above.

The processing circuit 420 may further perform data processing functions for inputting, outputting, and processing of data comprising data buffering and device control functions, such as call processing control, user interface control, or the like.

The communication device 110 may further, according to some alternative embodiments comprise a transmitter 430 configured for initiating call back using the second subscriber identity 440-2, when the user of the communication device 110 selects to call back using the second subscriber identity 440-2.

According to some alternative embodiments, the transmitter 430 may be further configured for initiating call back using the second subscriber identity 440-2, when it is determined 303 that the second subscriber identity 440-2 is more prioritized than the first subscriber identity 440-1.

In addition, according to some embodiments, the communication device 110 may comprise a receiver 410 configured for receiving radio signals over a wireless interface. The radio signals may be received from e.g. the other communication device 130, via the network node 120, or any other entity configured for wireless communication according to some embodiments.

Furthermore, the communication device 110 may comprise a memory 425. The optional memory 425 may comprise a physical device utilised to store data or programs i.e. sequences of instructions, on a temporary or permanent basis. According to some embodiments, the memory 425 may comprise integrated circuits comprising silicon-based transistors. Further, the memory 425 may be volatile or non-volatile.

The actions 301-304 to be performed in the communication device 110 may be implemented through the one or more processing circuits 420 in the communication device 110, together with computer program code for performing the functions of the actions 301-304. Thus a computer program product, comprising instructions for performing the actions 301-304 in the communication device 110 may be configured for performing the method 300 for facilitating call back according to any of actions 301-304, when the computer program is loaded in a processing circuit 420 of the communication device 110.

The computer program product mentioned above may be provided for instance in the form of a data carrier carrying computer program code for performing at least some of the actions 301-304 according to some embodiments when being loaded into the processing circuit 420. The data carrier may be e.g. a hard disk, a Compact Disc Read-Only Memory (CD ROM) disc, a memory stick, an optical storage device, a magnetic storage device or any other appropriate medium such as a disk or tape that may hold machine readable data in a non transitory manner. The computer program product may furthermore be provided as computer program code on a server and downloaded to the communication device 110 remotely, e.g. over an Internet or an intranet connection.

The terminology used in the detailed description of the invention as illustrated in the accompanying drawings is not intended to be limiting of the described method 300 and communication device 110, which instead are limited by the enclosed claims.

As used herein, the term "and/or" comprises any and all combinations of one or more of the associated listed items. In addition, the singular forms "a", "an" and "the" are to be interpreted as "at least one", thus also comprising a plurality, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

What is claimed is:

1. A method in a communication device for facilitating call back, comprising:

receiving a telephone call on a first subscription that is associated with a first subscriber identity from another communication device;

determining an order of prioritization among subscriber identities according to at least one parameter for establishing the telephone call with the other communication device on the subscription associated with the respective subscriber identities; and facilitating callback to the other communication device using a second subscriber identity when it is determined that the second subscriber identity is more prioritized than the first subscriber identity, wherein the communication device is configured for multiple subscriber identities, wherein the multiple subscriber identities comprise the first subscriber identity and the second subscriber identity, wherein the callback is facilitated by presenting a list of alternatives to a user on a display of the communication device, wherein the list of alternatives comprises accepting the call, rejecting the call, and calling back the other communication device using the second subscriber identity, wherein the list of alternatives further comprises a list of subscription identities that may be used to call back the other communication device, wherein the list of subscription identities are presented in a decreasing order of preference, wherein each of the subscription identities corresponds to a subscription identity module of the communication device, and wherein the communication device comprises three or more subscription identity modules.

2. The method according to claim 1, wherein facilitating callback to the other communication device comprises:
   presenting a list of alternatives to the user of the communication device, wherein the list of alternatives comprises at least one of: accepting the call, rejecting the call, callback using the second subscriber identity, and callback using the subscriber identity which is most prioritized;
   acquiring a user selection of one of the presented alternatives on the list from the user of the communication device;
   rejecting the incoming call; and
   initiating callback using the second subscriber identity when the user of the communication device selects to callback using the second subscriber identity.

3. The method according to claim 1, wherein facilitating callback to the other communication device comprises:
   rejecting the incoming call; and
   initiating callback using the second subscriber identity when it is determined that the second subscriber identity is more prioritized than the first subscriber identity.

4. The method according to claim 1, further comprising checking availability of alternative subscriptions associated with the subscriber identities on the communication device.

5. The method according to claim 1, wherein the first subscriber identity and the second subscriber identity comprise any of a Subscriber Identification Module (SIM) card, a Universal Integrated Circuit Card (UICC), a Universal Subscriber Identity Module (USIM), an Internet protocol multimedia Services Identity Module (ISIM), a Removable User Identity Module (R-UIM), a Code Division Multiple Access (CDMA) Subscriber Identity Module (CSIM), Willcom-SIM (W-SIM), and/or a Voice over the Internet Protocol (VoIP) subscription.

6. The method according to claim 1, wherein the at least one parameter used for determining the order of prioritization among the subscriber identities comprises price, link quality, time of the day, roaming, location of the communication device, and/or properties of the other communication device.

7. The method according to claim 1, wherein the method is only performed when the telephone number of the other communication device is available.

8. The method according to claim 1, wherein the communication device configured for the multiple subscriber identities is configured for communication on any technology of: Global System for Mobile Communications (GSM), Enhanced Data Rates for GSM Evolution (EDGE), Universal Mobile Telecommunications System (UMTS), Code Division Multiple Access (CDMA), CDMA 2000, Time Division Synchronous CDMA (TD-SCDMA), Long Term Evolution (LTE), Wireless Fidelity (Wi-Fi) as defined by any of Institute of Electrical and Electronics Engineers (IEEE) standards 802.11 a, b, g and/or n and/or the Internet Protocol (IP).

9. A communication device configured for multiple subscriber identities, comprising:
   at least a first subscriber identity;
   a second subscriber identity;
   a receiver configured for receiving a telephone call on a first subscription associated with the first subscriber identity from another communication device;
   a processing circuit configured for determining an order of prioritization among the subscriber identities according to at least one parameter for establishing the telephone call with the other communication device and also configured for facilitating callback to the other communication device using the second subscriber identity when it is determined that the second subscriber identity is more prioritized than the first subscriber identity, and
   a display for presenting a list of alternatives to a user of the communication device,
   wherein the list of alternatives comprises accepting the call, rejecting the call, and calling back the other communication device using the second subscriber identity,
   wherein the list of alternatives further comprises a list of subscription identities that may be used to call back the other communication device,
   wherein the list of subscription identities are presented in a decreasing order of preference,
   wherein each of the subscription identities corresponds to a subscription identity module of the communication device, and
   wherein the communication device comprises three or more subscription identity modules.

10. The communication device according to claim 9, further comprising:
    a display for presenting a list of alternatives to the user of the communication device, wherein the list of alternatives comprises at least one of: accepting the call, rejecting the call, callback using the second subscriber identity, and callback using the subscriber identity which is most prioritized; and
    a transmitter configured for initiating callback using the second subscriber identity when the user of the communication device selects to callback using the second subscriber identity,
    wherein the processing circuit is further configured for acquiring a selection of one of the presented alternatives on the list from the user of the communication device and also configured for rejecting the incoming call.

11. The communication device according to claim 9, wherein the processing circuit is further configured for rejecting the incoming call, and wherein the communication device further comprises a transmitter configured for initiating callback using the second subscriber identity when it is determined that the second subscriber identity is more prioritized than the first subscriber identity.

12. The communication device according to claim 9, wherein the processing circuit is further configured for checking availability of alternative subscriptions associated with subscriber identities on the communication device.

13. The communication device according to claim 9, wherein the first subscriber identity and the second subscriber identity comprise any of a Subscriber Identification Module (SIM) card, a Universal Integrated Circuit Card (UICC), a Universal Subscriber Identity Module (USIM), an Internet protocol multimedia Services Identity Module (ISIM), a Removable User Identity Module (R-UIM), a Code Division Multiple Access (CDMA) Subscriber Identity Module (CSIM), a Willcom-SIM (W-SIM), and/or a Voice over the Internet Protocol (VoIP) subscription.

14. The communication device according to claim 9, wherein the at least one parameter used for determining the order of prioritization among the alternative subscriptions comprises price, link quality, time of the day, roaming, location of the communication device, and/or properties of the other communication device.

15. The communication device according to claim 9, wherein the processing circuit is further configured for only performing the method when the telephone number of the other communication device is available.

16. The communication device according to claim 9, wherein the communication device is configured for communication on any technology of: Global System for Mobile Communications (GSM), Enhanced Data Rates for GSM Evolution (EDGE), Universal Mobile Telecommunications System (UMTS), Code Division Multiple Access (CDMA), CDMA 2000, Time Division Synchronous CDMA (TD-SCDMA), Long Term Evolution (LTE), Wireless Fidelity (Wi-Fi) as defined by any of Institute of Electrical and Electronics Engineers (IEEE) standards 802.11 a, b, g and/or n and/or the Internet Protocol (IP).

17. A non-transitory computer program product in a communication device, which when loaded in a processing circuit of the communication device, causes the communication device to perform a method for facilitating call back comprising:

receiving a telephone call on a first subscription that is associated with a first subscriber identity from another communication device;

determining an order of prioritization among subscriber identities according to at least one parameter for establishing the telephone call with the other communication device on the subscription associated with the respective subscriber identities; and facilitating callback to the other communication device using a second subscriber identity when it is determined that the second subscriber identity is more prioritized than the first subscriber identity, wherein the communication device is configured for multiple subscriber identities, wherein the multiple subscriber identities comprise the first subscriber identity and the second subscriber identity, wherein the callback is facilitated by presenting a list of alternatives to a user on a display of the communication device, wherein the list of alternatives comprises accepting the call, rejecting the call, and call back the other communication device using the second subscriber identity, wherein the list of alternatives further comprises a list of subscription identities that may be used to call back the other communication device, wherein the list of subscription identities are presented in a decreasing order of preference, wherein each of the subscription identities corresponds to a subscription identity module of the communication device, and wherein the communication device comprises three or more subscription identity modules.

* * * * *